(12) United States Patent
Mizutani et al.

(10) Patent No.: US 8,111,334 B2
(45) Date of Patent: Feb. 7, 2012

(54) SIGNAL SWITCHING APPARATUS AND CONTROL METHOD OF SIGNAL SWITCHING APPARATUS

(75) Inventors: Tomoji Mizutani, Kanagawa (JP); Masato Noguchi, Kanagawa (JP)

(73) Assignee: Sony Corporation, Tokyo (JP)

(*) Notice: Subject to any disclaimer, the term of this patent is extended or adjusted under 35 U.S.C. 154(b) by 493 days.

(21) Appl. No.: 12/414,912

(22) Filed: Mar. 31, 2009

(65) Prior Publication Data
US 2009/0244393 A1 Oct. 1, 2009

(30) Foreign Application Priority Data
Apr. 1, 2008 (JP) .............................. P2008-095444

(51) Int. Cl.
H04N 7/01 (2006.01)
H04N 5/46 (2006.01)
H04N 5/04 (2006.01)
H04N 9/44 (2006.01)
H04N 5/268 (2006.01)
H04N 5/222 (2006.01)
H04N 9/45 (2006.01)

(52) U.S. Cl. ........ 348/705; 348/706; 348/722; 348/441; 348/555; 348/500; 348/521

(58) Field of Classification Search .................. 348/441, 348/555, 584, 705, 706, 500, 501, 542, 525–526, 348/521, 598, 599, 722
See application file for complete search history.

(56) References Cited

U.S. PATENT DOCUMENTS

| 5,420,856 | A | * | 5/1995 | Kerns | 370/359 |
|---|---|---|---|---|---|
| 5,557,342 | A | * | 9/1996 | Eto et al. | 348/706 |
| 5,850,266 | A | * | 12/1998 | Gimby | 348/558 |
| 5,905,538 | A | * | 5/1999 | Shuholm et al. | 348/555 |
| 6,130,725 | A | * | 10/2000 | Liron | 348/705 |
| 6,211,918 | B1 | * | 4/2001 | Uwabata et al. | 348/458 |
| 6,292,229 | B1 | * | 9/2001 | Meyer | 348/705 |
| 6,299,229 | B1 | * | 10/2001 | Becenas Nieto | 296/24.3 |
| 6,353,460 | B1 | * | 3/2002 | Sokawa et al. | 348/555 |
| 6,437,834 | B1 | * | 8/2002 | Tagami | 348/705 |
| 6,927,801 | B2 | * | 8/2005 | Yugami et al. | 348/458 |
| 7,030,932 | B2 | * | 4/2006 | Han | 348/554 |
| 7,190,412 | B2 | * | 3/2007 | Ellett | 348/705 |
| 7,209,184 | B2 | * | 4/2007 | Byrne | 348/705 |
| 7,236,210 | B2 | * | 6/2007 | Iwase | 348/584 |
| 7,362,383 | B2 | * | 4/2008 | Reneau et al. | 348/706 |
| 7,365,752 | B2 | * | 4/2008 | Xie | 345/560 |
| 7,542,099 | B2 | * | 6/2009 | Ellgen et al. | 348/706 |
| 7,589,794 | B2 | * | 9/2009 | Adachi | 348/555 |
| 7,602,446 | B2 | * | 10/2009 | Ross et al. | 348/578 |
| 7,667,774 | B2 | * | 2/2010 | Murakami | 348/500 |
| 7,893,996 | B2 | * | 2/2011 | Murakami | 348/500 |
| 7,903,172 | B2 | * | 3/2011 | Palgrave-Moore et al. | 348/441 |

(Continued)

FOREIGN PATENT DOCUMENTS

JP 7 38807 2/1995

(Continued)

*Primary Examiner* — Brian Yenke (74) *Attorney, Agent, or Firm* — Frommer Lawrence & Haug LLP; William S. Frommer; Thomas F. Presson (57) ABSTRACT

A signal switching apparatus includes: a video reference input block; a plurality of synchronous signal generating blocks; a plurality of video signal input blocks; a signal processing block; a video signal output processing block; a switching block; and a control block.

5 Claims, 5 Drawing Sheets

U.S. PATENT DOCUMENTS

| | | |
|---|---|---|
| 7,916,215 B2 * | 3/2011 | Wu et al. ......................... 348/558 |
| 7,982,726 B2 * | 7/2011 | Kim et al. ...................... 345/204 |
| 2001/0015771 A1 * | 8/2001 | Kishimoto et al. ........... 348/705 |
| 2005/0024532 A1 * | 2/2005 | Choi .............................. 348/441 |
| 2005/0024534 A1 * | 2/2005 | Honda et al. .................. 348/441 |
| 2007/0143576 A1 * | 6/2007 | Ellgen et al. .................... 712/10 |

FOREIGN PATENT DOCUMENTS

| | | |
|---|---|---|
| JP | 7 134577 | 5/1995 |
| JP | 2007 135079 | 5/2007 |

* cited by examiner

SIGNAL SWITCHING APPARATUS AND CONTROL METHOD OF SIGNAL SWITCHING APPARATUS

BACKGROUND OF THE INVENTION

1. Field of the Invention

The present invention relates to a signal switching apparatus configured to switch between two or more input video signals through a switching block and output switched signals, and a control method of the signal switching apparatus.

2. Description of the Related Art

In broadcasting and recording programs in broadcasting stations, the video signals from many video cameras arranged in a studio or a live-coverage site and the signals reproduced by a VTR are led in a signal switching apparatus called a switcher to determine which of the input signals is to be switched to which device of the devices connected.

Above-mentioned switcher includes a routing switcher for simply switching between video signal input/output destinations (refer to Japanese Patent Laid-open No. 2007-135079) and a switcher having signal processing capabilities of signal-processing input video signals and outputting the processed video signals.

With the known switcher incorporating signal processing capabilities, the whole system executes signal processing by one video format synchronized with one video reference. Therefore, with this switcher, if video signals having different video formats are inputted or outputted, format converters for video format conversion must be provided in front of the input block and in the rear of the output block.

SUMMARY OF THE INVENTION

As described above, with the related-art switcher incorporating signal processing capabilities, the whole system operates in synchronization with one video reference, so that simultaneously performing signal processing on the video signals having two or more video formats requires the use of two or more switchers. Further, with this existing switcher, if signal processing is executed on the video signals while executing video format switching, it is required to change the connection positions of format converters to be separately connected in accordance with the video format switching, thereby present a problem of deteriorating user convenience.

Therefore, the present invention addresses the above-identified and other problems associated with known methods and apparatuses and solves the addressed problems by providing a signal switching apparatus and a control method for controlling this signal switching apparatus that are configured to input/output video signals and capable of executing signal processing with two or more video formats while preventing the increase of system scale and providing a work environment high in user convenience.

In carrying out the invention and according to one embodiment thereof, there is provided a signal switching apparatus. This signal switching apparatus has a video reference input block in which video references having a plurality of types are entered; a plurality of synchronous signal generating blocks configured to generate a synchronous signal from each of the video references having a plurality of types entered from the video reference input block; a plurality of video signal input blocks in which a video signal having a video format corresponding to each of the video references having a plurality of types is entered; a signal processing block configured to execute signal processing on the video signal in synchronization with a synchronous signal generated by one of the plurality of synchronous signal generating blocks; a video signal output processing block configured to output the video signal in synchronization with a synchronous signal generated by one of the plurality of synchronous signal generating block; a switching block configured to switch between supply destinations in which the signal processing block and the video signal output processing block to which a video signal entered in each of the plurality of video signal input blocks and a video signal subjected to signal processing by the signal processing block are supplied in synchronization with each of synchronous signals generated by the plurality of synchronous signal generating blocks; and a control block configured to control a connection relationships that are switched by the switching block. The control block controls the signal processing block to execute signal processing on the video signal in synchronization with a synchronous signal generated from a video reference corresponding to a format of a video signal to be supplied to the signal processing block via the switching block. The control block controls the video signal output processing block to output the video signal in synchronization with a synchronous signal generated from a video reference corresponding to a format of a video signal to be supplied to the video signal output processing block via the switching block.

In carrying out the invention and according to another embodiment thereof, there is provided a control method of a signal switching apparatus. This control methods has the steps of: entering, through a video reference input block, video references having a plurality of types; generating, through a plurality of synchronous signal generating block, a synchronous signal from each of the video references having a plurality of types entered from the video reference input block; entering, through a plurality of video signal input blocks, a video signal having a video format corresponding to each of the video references having a plurality of types; executing, through a signal processing block, signal processing on the video signal in synchronization with a synchronous signal generated by one of the plurality of synchronous signal generating blocks; outputting, through a video signal output processing block, the video signal in synchronization with a synchronous signal generated by one of the plurality of synchronous signal generating block; switching, through a switching block, between supply destinations in which the signal processing block and the video signal output processing block to which a video signal entered in each of the plurality of video signal input blocks and a video signal subjected to signal processing by the signal processing block are supplied in synchronization with each of synchronous signals generated by the plurality of synchronous signal generating blocks; controlling, in synchronization with a synchronous signal generated from the video reference corresponding to the format of a video signal to be supplied to the signal processing block via the switching block, the signal processing block so as to execute signal processing on the video signal; and controlling the video signal output processing block in synchronization with a synchronous signal generated from the video reference corresponding to the format of a video signal to be supplied to the video signal output processing block via the switching block.

In the embodiments of the present invention, in synchronization with a synchronous signal generated from a video reference corresponding to a format of a video signal to be supplied to a signal processing block via a switching block, the signal processing block executes signal processing on the video signal. In synchronization with a synchronous signal generated from a video reference corresponding to a format of video signal to be supplied to a video signal output processing block via the switching block, the video signal output processing block outputs the video signal. This novel configuration allows the simultaneous signal processing with two or more video formats for video signal input/output processing, while preventing the system scale from growing and providing a work environment that is highly convenience for the user.

DETAILED DESCRIPTION OF THE PREFERRED EMBODIMENTS

This invention will be described in further detail by way of embodiments thereof with reference to the accompanying drawings. A signal switching apparatus to which present invention is applied is an apparatus configured to switch between two or more input video signals by a switching block arranged in this signal switching apparatus and output the switched signals.

First Embodiment

Figure 1:
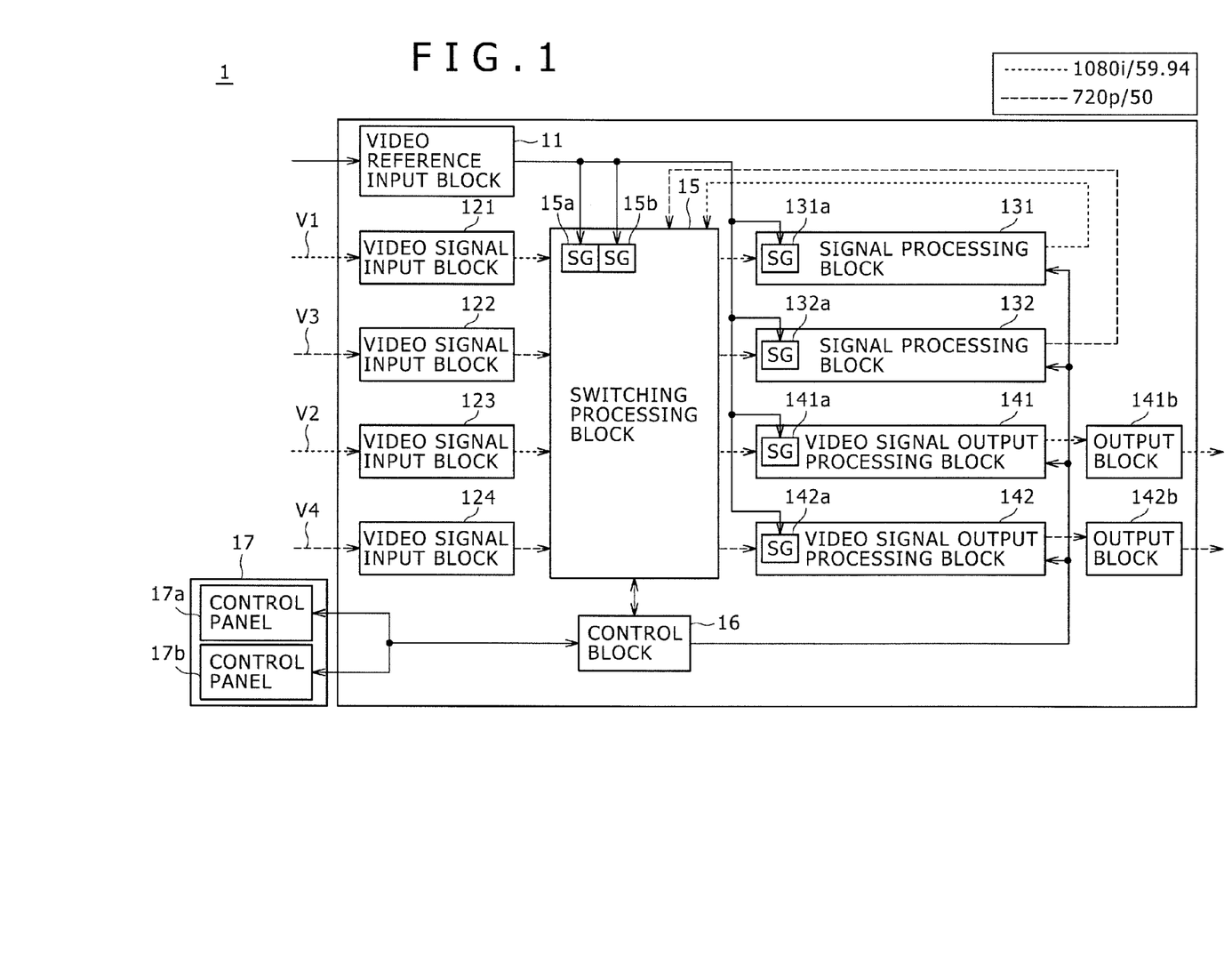
FIG. 1 is a block diagram illustrating a switcher practiced as a first embodiment of the present invention that is a signal switching apparatus to which the present invention is applied.

The following describes a first embodiment of the present invention by use of a switcher 1 as shown in FIG. 1 by way of example.

The switcher 1 is a video signal input/output signal switching apparatus capable of simultaneously executing signal processing with two or more video formats. To be more specific, with the switcher 1, video signals are input/output that correspond to two types of video formats; progressive type with frame rate being 50 Hz and the number of effective scan lines being 720 (hereafter referred to as video format 720p/50) and interlace type with frame rate being 59.94 Hz and the number of effective scan lines being 1080 (hereafter referred to as video format 1080i/59.94), for example. It should be noted that each video signal flow of video format 1080i/59.94 is indicated by a dotted line and each video signal flow of video format 720p/50 is indicated by a dashed line.

Namely, in order to handle the video signals having these types of video formats, the switcher 1 has a video reference input block 11, four video signal input blocks 121 through 124, two signal processing blocks 131 and 132, two video signal output processing blocks 141 and 142, a switching processing block 15, and a control block 16.

This switcher 1 is connected with controls panels 17a and 17b. Namely, cross point setting information indicative which processing block is to be connected to which else processing block via a connection point of the switching processing block 15 and processing setting information indicative what processing is to be performed by each processing block are set by the user through the control panel 17a and the control panel 17b, respectively. The control panel 17a and the control panel 17b supply each item of setting information set through them to the control block 16. It is assumed that the setting information associated with video signals of video format 1080i/59.94 be entered through the control panel 17a and the setting information associated with video signals of video format 720p/50 be entered through the control panel 17b. It should be noted that the control panels 17a 17b are generically referred to as a control panel 17.

Through the video reference input block 11, video references of two or more types are entered from the outside. To be more specific, through the video reference input block 11, video references corresponding to video format 720p/50 and video format 1080i/59.94 are entered, the entered video references being supplied to the signal processing blocks 131 and 132, the video signal output processing blocks 141 and 142, and the switching processing block 15.

Through the video signal input blocks 121 through 124, the video signals having video formats corresponding to the video references to be entered in the video reference input block 11 are entered.

To be more specific, in the switcher 1, SDI (Serial Digital Interface) signals of two video format types are entered in the video signal input blocks 121 through 124 as video signals and the entered SDI signals are converted into in-device signals to be differentially transmitted in each component block of the switcher 1, the converted signals being supplied to the switching processing block 15.

Namely, the video signal input blocks 121 and 123 receive video signals V1 and V2 that are SDI signals having video format 1080i/59.94, convert the video signals of the received SDI signals into video signals of in-device signals, and supply these video signals to the switching processing block 15. Also, the video signal input blocks 122 and 124 receive video signals V3 and V4 that are SDI signals having video format 720p/50, convert the video signals of the received SDI signals into video signals of in-device signals, and supply these video signals to the switching processing block 15.

The signal processing blocks 131 and 132 execute signal processing on the video signals entered through the switching processing block 15 and reenters the processed video signals into the switching processing block 15.

To be more specific, the signal processing block 131 has a signal generator 131a for generating a synchronous signal from a video reference supplied from the video reference input block 11. In synchronization with the synchronous signal generated by the signal generator 131a, the signal processing block 131 executes authoring processing for manipulating an image of one video signal and authoring processing, such as synthesis processing for synthesizing two or more video signals having a same video format, for example.

Likewise, the signal processing block 132 has a signal generator 132a for generating a synchronous signal from a video reference supplied from the video reference input block 11. In synchronization with the synchronous signal generated by the signal generator 132a, the signal processing block 132 executes authoring processing for manipulating an image of one video signal and authoring processing, such as synthesis processing for synthesizing two or more video signals having a same video format, for example.

The video signal output processing blocks 141 and 142 execute the following output processing on the video signals entered via the switching processing block 15.

To be specific, the video signal output processing block 141 has a signal generator 141a for generating a synchronous signal from a video reference supplied from the video reference input block 11. In synchronization with a synchronous signal generated by this signal generator 141a, the video signal output processing block 141 executes authoring processing for adding character information, such as safe title and superimposition, to an image as output processing, for example.

The video signal output processing block 141 also has, at a subsequent stage thereof, an output block 141b for converting a video signal that is an in-device signal into a video signal that is an SDI signal and outputting the converted signal to the outside. The output block 141b converts an in-device signal authored by the video signal output processing block 141 into an SDI signal and outputs the SDI signal to the outside.

Likewise, the video signal output processing block 142 has a signal generator 142a for generating a synchronous signal from a video reference supplied from the video reference input block 11. In synchronization with a synchronous signal generated by this signal generator 142a, the video signal output processing block 142 executes authoring processing for adding character information, such as safe title and superimposition, to an image as output processing, for example.

The video signal output processing block 142 also has, at a subsequent stage thereof, an output block 142b for converting a video signal that is an in-device signal into a video signal that is an SDI signal and outputting the converted signal to the outside. The output block 141b converts an in-device signal authored by the video signal output processing block 142 into an SDI signal and outputs the SDI signal to the outside.

The switching processing block 15 receives in-device signals from the video signal input blocks 121 through 124 and the signal processing blocks 131 and 132 and executes switching to supply the received video signals to the signal processing blocks 131 and 132 and the video signal output processing blocks 141 and 142.

To be more specific, the switching processing block 15 has two signal generators 15a and 15b for generating synchronous signals from two types of video references 1080i/59.94 and 720p/50 entered from the video reference input block 11. In synchronization with the synchronous signals generated by the signal generators 15a and 15b, the switching processing block 15 connects the above-mentioned processing blocks in correspondence with the two video formats 1080i/59.94 and 720p/50.

In accordance with the setting information set through the control panels 17a and 17b, the control block 16 executes control which of the control blocks connected to the switching processing block 15 is to be connected to which else processing block and, at the same time, controls operations of these processing blocks as follows.

In the present embodiment, the processing to be executed by the control block 16 will be described by use of a specific example in which the signal processing blocks 131 and 132 execute image processing on the video signals of video formats 1080i/59.94 and 720p/50, respectively, and the video signal output processing blocks 141 and 142 output the video signals of video formats 1080i/59.94 and 720p/50, respectively, to the outside In order to control the input/output on a video signal of video format 1080i/59.94, the control block 16 controls the switching processing block 15 such that the video signals entered from the video signal input blocks 121 and 123 and the signal processing block 131 into the switching processing block 15 are supplied to the signal processing block 131 and the video signal output processing block 141, respectively, in accordance with the setting entered through the control panel 17a.

Further, in order to generate a synchronous signal from the video reference corresponding to video format 1080i/59.94 of a video signal supplied to the signal processing block 131 via the switching processing block 15, the control block 16 controls the signal generator 131a of the signal processing block 131. Likewise, in order to generate a synchronous signal from the video reference corresponding to video format 1080i/59.94 of a video signal supplied to the signal processing block 141 via the switching processing block 15, the control block 16 controls the signal generator 141a of the signal processing block 141.

In order to control the input/output on a video signal of video format 720p/50, the control block 16 controls the switching processing block 15 such that the video signals entered from the video signal input blocks 122 and 124 and the signal processing block 132 are supplied to the signal processing block 132 and the video signal output processing block 142, respectively, in accordance with the setting entered through the control panel 17b.

In order to generate a synchronous signal from the video reference corresponding to video format 720p/50 of a video signal supplied to the signal processing block 132 via the switching processing block 15, the control block 16 controls the signal generator 132a of the signal processing block 132. Likewise, in order to generate a synchronous signal from the video reference corresponding to video format 720p/50 of a video signal supplied to the video signal output processing block 142 via the switching processing block 15, the control block 16 controls the signal generator 142a of the video signal output processing block 142.

In the switcher 1 having the configuration described above, in synchronization with a synchronous signal generated from the video reference corresponding to the format of a video signal to be supplied to the signal processing blocks 131 and 132 via the switching processing block 15, the signal processing blocks 131 and 132 execute signal processing on the video signal. Also, in the switcher 1, in synchronization with a synchronous signal generated from the video reference corresponding to the format of a video signal to be supplied to the video signal output processing blocks 141 and 142 via the switching processing block 15, the video signal output processing blocks 141 and 142 output the video signal.

Thus, in the switcher 1, each processing block selects a given video format and operates in synchronization with a synchronous signal corresponding to the selected video format, so that signal processing can be executed with two or more video formats at the same time to input/output video signals while preventing the system scale from growing and providing a work environment that is high in convenience for the user.

It should be noted that, in the switcher 1, it is practicable to make common the signal generators for generating synchronous signals from similar video references and selectively use a signal generator for generating a synchronous signal corresponding to the video format of a video signal to be processed by each processing block from among the two or more signal generator made common for each video reference.

Namely, in the switcher 1, instead of the signal generators 15a, 131a, and 141a for generating a synchronous signal from similar video references, one signal generator may be used to generate a synchronous signal from the video reference corresponding to video format 1080i/59.94, thereby operating the switching processing block 15, the signal processing block 131, and the video signal output processing block 141 in synchronization with the synchronous signal generated by this signal generator.

Likewise, in the switcher 1, instead of the signal generators 15b, 132a, and 142a for generating a synchronous signal from similar video references, one signal generator may be used to generate a synchronous signal from the video reference corresponding to video format 720p/50, thereby operating the switching processing block 15, the signal processing block 132, and the video signal output processing block 142 in synchronization with the synchronous signal generated by this signal generator.

In addition, the switcher 1 can handle video signals of more video formats. In this case, the video references of types corresponding to the video format to be handled are entered from the video reference input block 11 and synchronous signals are generated from the video references by two or more signal generators to let each component block select a desired synchronous signal from among these synchronous signals for operation.

If the switcher 1 is used for the processing of simultaneous broadcasting in which video signals having the same contents are broadcast with different video formats, the setting can be executed by one control panel instead of the control panels 17a and 17b on which the setting is executed for each video format as described above, thereby reducing the system scale.

Second Embodiment

Figure 2:
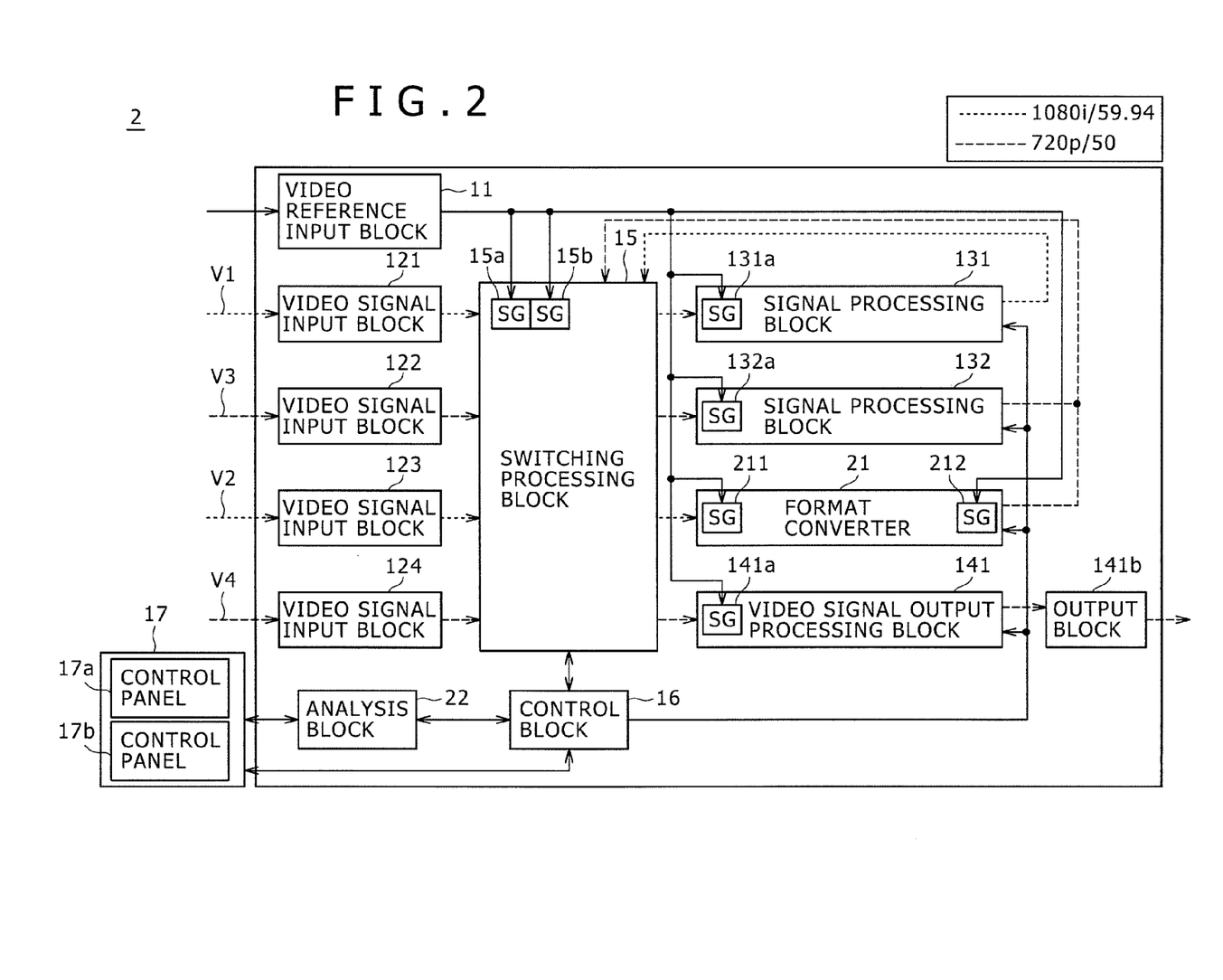
FIG. 2 a block diagram illustrating a switcher practiced as a second embodiment of the present invention that is a signal switching apparatus to which the present invention is applied.

The following describes a configuration of a switcher 2, as shown in FIG. 2, practiced as a second embodiment of the present invention.

Like the switcher 1 practiced as the first embodiment described above, it is assumed that the switcher 2 practiced as the second embodiment switch between the video signals of two video formats, video format 720p/50 and video format 1080i/59.94 as an example of video signals of two or more video formats. It should be noted that, in FIG. 2, each video signal flow of video format 1080i/59.94 is indicated by a dotted line and each video signal flow of video format 720p/50 is indicated by a dashed line.

Namely, in order to handle the video signals having these two video formats, the switcher 2 has a video reference input block 11, four video signal input blocks 121 through 124, two signal processing blocks 131 and 132, a video signal output processing block 141, a switching processing block 15, a control block 16, a format converter 21, and an analysis block 22. In addition, the switcher 2 is supposed to have two control panels 17a and 17b. It should be noted that, with reference to FIG. 2, components similar to those previously described with reference to FIG. 1 are denoted by the same reference numerals and the description thereof will be skipped.

In the switcher 2, the format converter 21 is connected to the switching processing block 15, so that the switching processing block 15 executes the following processing.

Namely, the switching processing block 15 receives video signals from the video signal input blocks 121 through 124, the signal processing blocks 131 and 132, and the format converter 21 to be described later and switches between the supplied video signals to supply them to the signal processing blocks 131 and 132, the format converter 21, and the video signal output processing block 141.

The format converter 21 receives the video signal of one of the video formats via the switching processing block 15 and converts the received video signal having this video format into the video signal of the other video format.

To be more specific, the format converter 21 has signal generators 211 and 212 for generating synchronous signals from video references 1080i/59.94 and 720p/50 supplied from the video reference input block 11. In synchronization with the synchronous signals generated by the signal generators 211 and 212, the format converter 21 operates, thereby converting the format of a video signal supplied from the switching processing block 15 to supply the converted video signal to the switching processing block 15. To be more specific, the operation of the format converter 21 is controlled by the control block 16.

The following describes processing associated with the control block 16 of the switcher 2. It is assumed that, in the switcher 2, the signal processing blocks 131 132 execute image processing on the video signals of video formats 1080i/59.94 and 720p/50, respectively. It is also assumed that, in the switcher 2, the format converter 21 convert a video signal of video format 1080i/59.94 into a video signal of video format 720p/50. Further, it is assumed that, in the switcher 2, the video signal output processing block 141 output the video signal of video format 720p/50 to the outside. The following describes the processing to be executed by the control block 16 by use of the above-mentioned processing as an example.

In order to control the input/output of the video signal having video format 1080i/59.94, the control block 16 controls the switching processing block 15 such that the video signals entered from the video signal input blocks 121 and 123 and the signal processing block 131 are supplied to the signal processing block 131 and the format converter 21, respectively in accordance with the setting done through the control panel 17a.

Further, the control block 16 controls the signal generator 131a of the signal processing block 131 such that a synchronous signal is generated from a video reference corresponding to video format 1080i/59.94 of a video signal supplied to the signal processing block 131 via the switching processing block 15. Likewise, the control block 16 controls the signal generator 211 such that a synchronous signal is generated from a video reference corresponding to video format 1080i/59.94 of a video signal supplied to the format converter 21 via the switching processing block 15.

Further, in order to control the input/output of a video signal having video format 720p/50, the control block 16 controls the switching processing block 15 such that video signals entered from the video signal input blocks 122 and 124, the signal processing block 132, and the format converter 21 are supplied to the signal processing blocks 132 and video signal output processing block 141 in accordance with the setting done through the control panel 17b.

Further, the control block 16 controls the signal processing generator 132a of the signal processing block 132 such that a synchronous signal is generated from a video reference corresponding to video format 720p/50 of a video signal supplied from the signal processing block 132 via the switching processing block 15. Likewise, the control block 16 controls the signal generator 212 of the format converter 21 such that a synchronous signal is generated from a video reference corresponding to video format 720p/50 of a video signal that is supplied to the format converter 21 via the switching processing block 15. Likewise, the control block 16 controls the signal generator 141a of the video signal output processing block 141 such that a synchronous signal is generated from a video reference corresponding to video format 720p/50 of a video signal to be supplied to the video signal output processing block 141 via the switching processing block 15.

Like the switcher 1 practiced as the first embodiment, the switcher 2 having the configuration described above can input/output a video signal by executing signal processing with two or more video formats at the same time while preventing the system scale from growing and providing a work environment high in convenience for the user.

In addition, because, in the switcher 2, the format of a video signal to be handled as an in-device signal can be converted by the format converter 21, authoring processing can be executed on the video signals having different video formats by the signal processing block 131 and the signal processing block 132.

Further, in the switcher 2, two or more video signals can be input/output at the same time by executing authoring processing on the video signals having different video formats without separately connecting a format converter.

The switcher 2 shown in FIG. 2 has a configuration in which one format converter 21 is connected internally; it is also practical to use more format converters to execute video signal switching processing.

It should be noted that the connection relationship set by the user so as to execute video signal format conversion inside the switcher by use of many format converters may include a case in which the connection relation is highly redundant and therefore the format conversion is executed the number of times more than necessary.

If a connection relationship high in redundancy is realized, the system scale and cost will increase unnecessarily. This also deteriorates the picture quality of video signals, so that the number of times format conversion is executed should be minimized.

Figure 3:
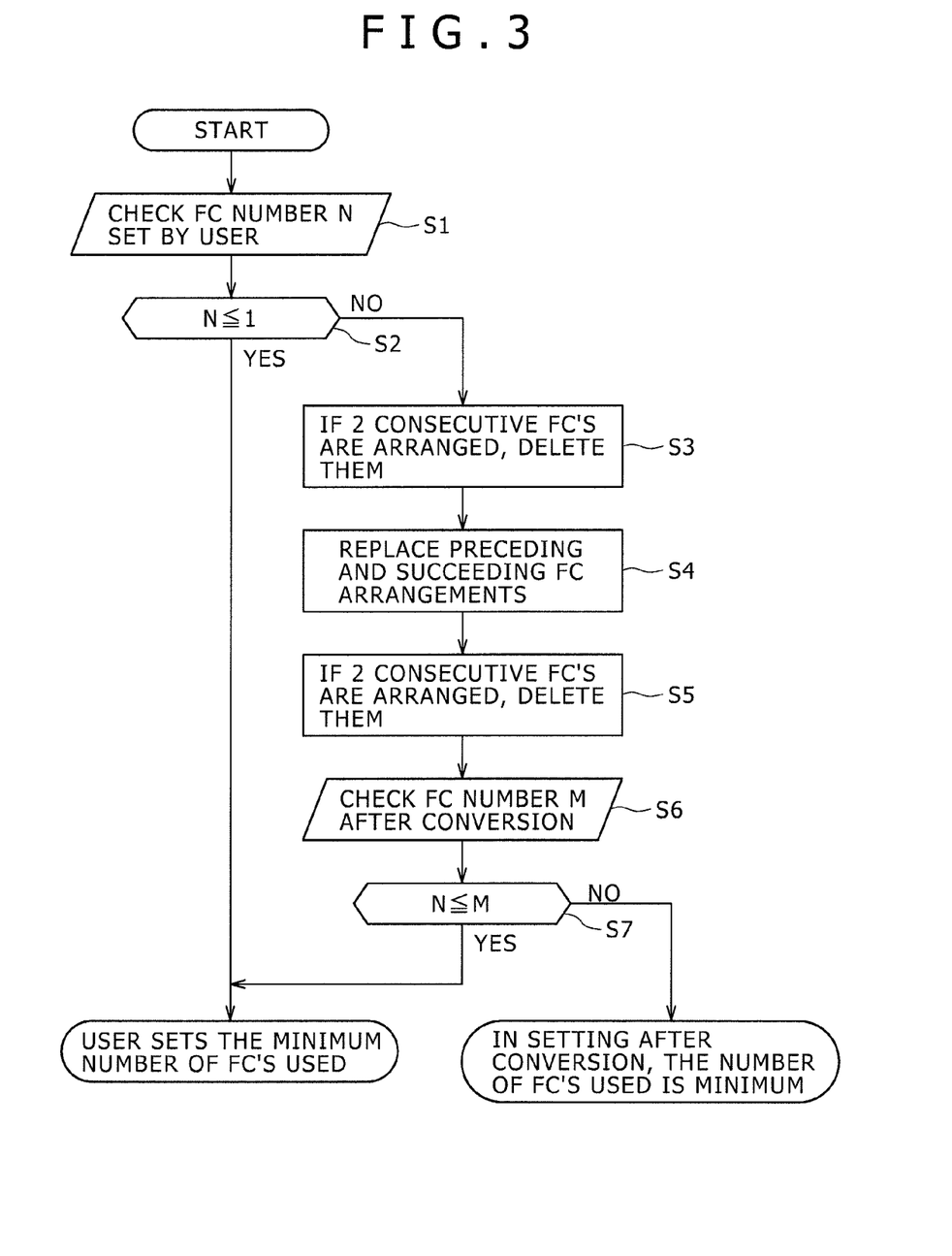
FIG. 3 is a flowchart indicative of a processing procedure to be executed by an analysis block.

Therefore, if two or more format converter FC connections to which video signals are supplied via the switching processing block 15 are set in accordance with the flowchart shown in FIG. 3, the analysis block 22 associated with the switcher 2 analyzes the connection relationship between the format converter FC and the signal processing block PROC. Next, on the basis of a result of this analysis, the analysis block 22 gets a connection relationship for executing signal processing equivalent to the set connection relationship by use of the format converters FC less than the number of set connections.

In step S1, the analysis block 22 checks N of the format converter FC set by the user, namely, the number of set connections and goes to step S2.

In step S2, the analysis block 22 determines whether or not the number of format converters FC set by the user, namely, N, is 1 or less. If N is found to be 1 or less, then the analysis block 22 transmits information "the user has set the minimum number of format converters FC" to the control panel 17, thereby ending this processing. If N is found to be higher than 1, or 2 or more, the analysis block 22 goes to step S3.

In step S3, if two format converters FC to be processed for one video signal are arranged consecutively, the analysis block 22 deletes the connection of these format converters FC and goes to step S4.

In step S4, the analysis block 22 executes the processing of converting the front-rear arrangement of the format converter FC and the signal processing block PROC in accordance with the logical compression as shown in FIG. 4 and goes to step S5.

Figure 4A:
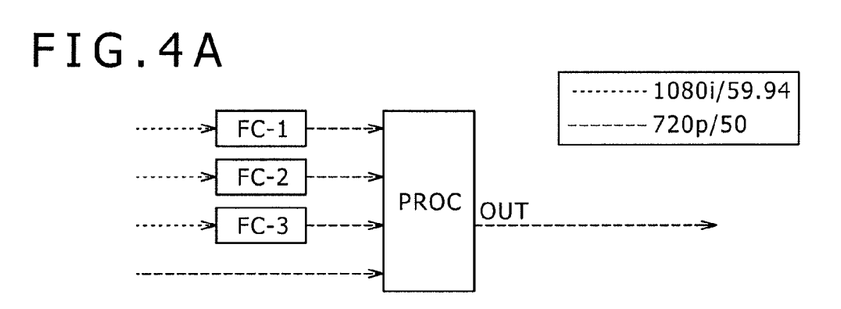
FIGS. 4A, 4B, 4C and 4D are circuit diagrams illustrating arrangement conversion processing to be executed by the analysis block.
Figure 4B:
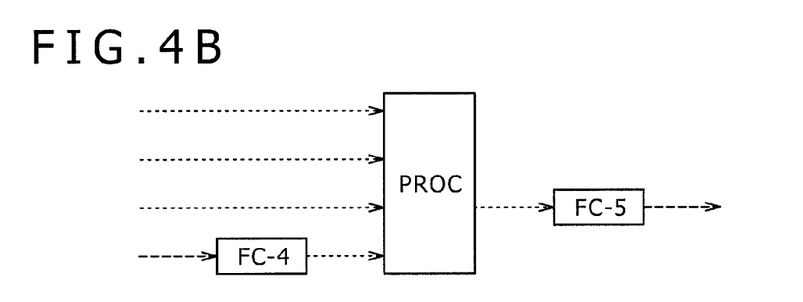
Figure 4C:
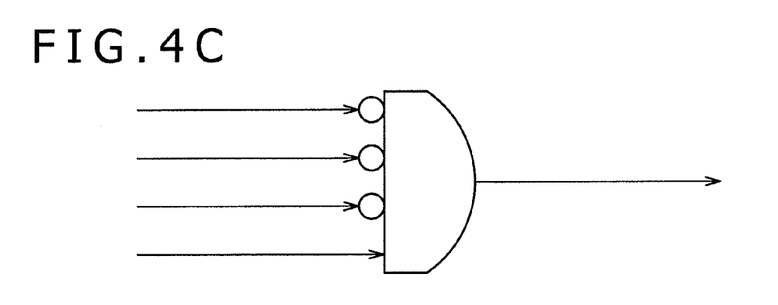
Figure 4D:
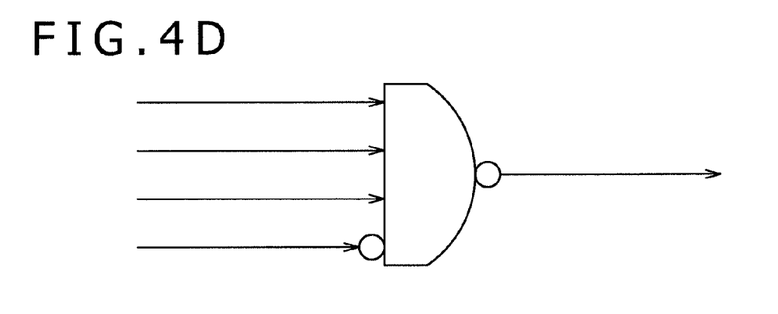

In step S4, if three format converters FC-1 through FC-3 are connected in front of the signal processing block PROC as shown in FIG. 4A for example, the analysis block 22 connects a format converter FC-4 to an input portion to which the format converters FC-1 through FC-3 are not connected in front of the signal processing block PROC and connects a format converter FC-5 to the rear of the signal processing block PROC as shown in FIG. 4B as an input/output system equivalent to the above-mentioned input/output system. Thus, the reason why the conversion to an equivalent input/output system can be realized is the input/output systems shown in FIG. 4A and FIG. 4B correspond to a positive logic circuit shown in FIG. 4C and a negative logic circuit shown in FIG. 4D equivalent in input/output relationship to the positive logic circuit. It should be noted that the flow of the video signal having video format 1080i/59.94 is indicated by a dotted line and the flow of the video signal having video format 720p/50 is indicated by a dashed line.

Thus, the analysis block 22 analyzes the connection relationship between the signal processing block PROC and the format converter FC to convert the arrangement of the format converters FC, thereby reducing the number of format converters FC used.

In step S5, if there is a portion in which two format converters FC to be processed for one video signal are consecutively arranged in the connection relationship after the conversion of arrangement executed in step S4, the analysis block 22 deletes the connection of these format converters FC and goes to step S6.

In step S6, the analysis block 22 checks the number of connections of format converters FC, namely M, in the connection relationship after the conversion of arrangement, and goes to step S7.

In step S7, the analysis block 22 determines whether or not the number of connections N of format converters in the connection relationship before the conversion of arrangement is less than the number of connections M of format converters FC in the connection relationship after the arrangement of conversion. Here, if N is less than M, the analysis block 22 transmits information "the user has set the minimum number of format converters FC" to the control panel 17 and ends this processing. If N is not less than M, namely, the number of format converters FC was decreased by the conversion of arrangement, the analysis block 22 transmits information "in the setting after arrangement conversion, the number of format converters FC used is minimum" to the control panel 17 and ends this processing.

Figure 5A:
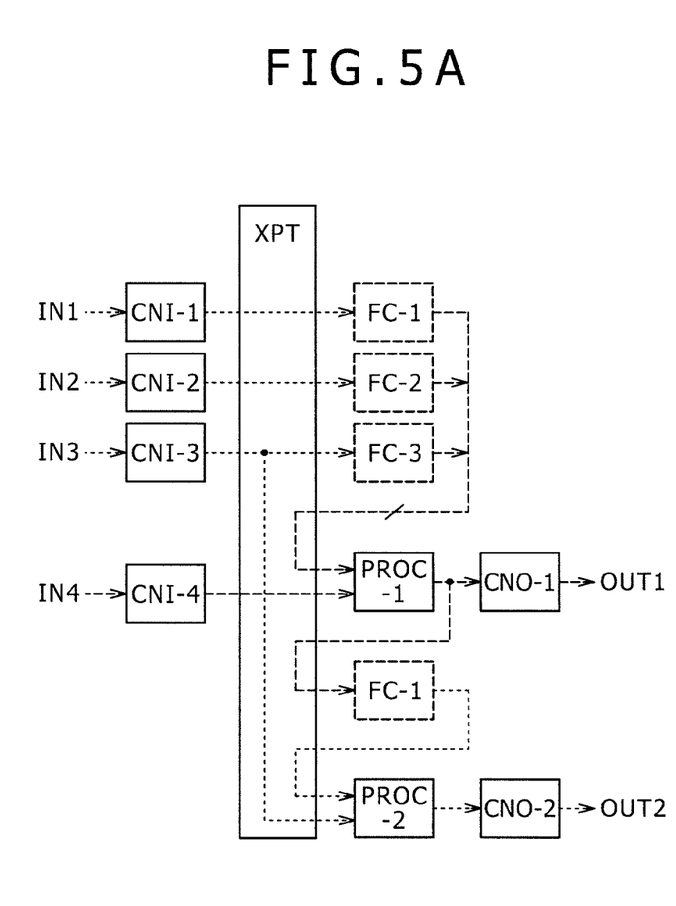
FIGS. 5A and 5B are block diagrams illustrating connection relations before and after arrangement conversion.
Figure 5B:
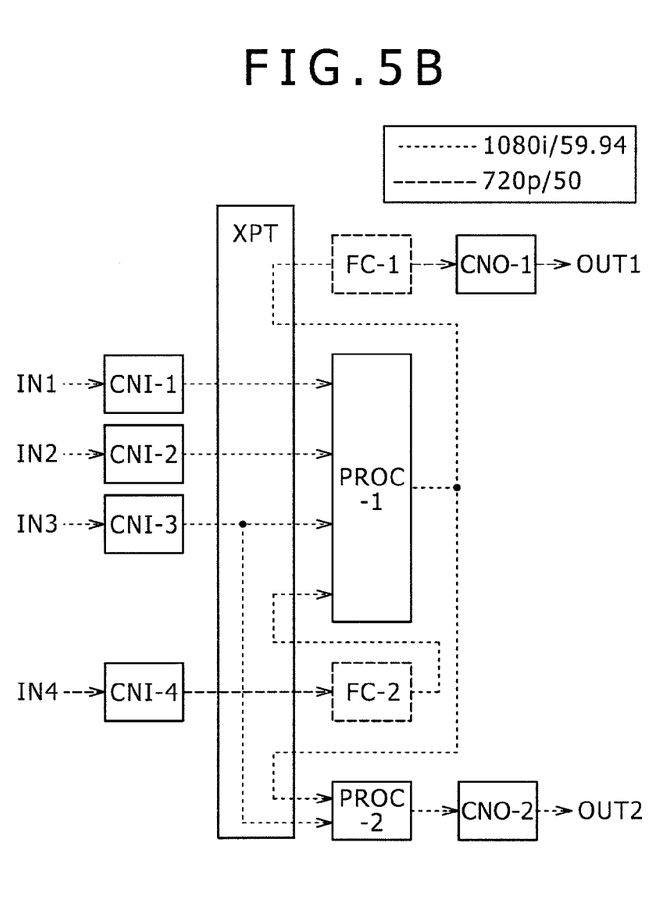

By executing the above-mentioned processing, the analysis block 22 can analyze the connection relationship high in redundancy set by the user as shown in FIG. 5A for example to get an optimum connection relationship with the number of format converters FC reduced as shown in FIG. 5B. It should be noted that, in FIG. 5A and FIG. 5B, the flow of each video signal having video format 1080i/59.94 is indicated by a dotted line and the flow of each video signal having video format 720p/50 is indicated by a dashed line.

To be more specific, referring to FIG. 5A, each video signal is processed as follows. Namely, video signals IN1 through IN3 having video format 1080i/59.94 and a video signal IN4 having video format 720p/50 are entered in switching processing block XPT via CN11 through CN14, prospectively. Video signals IN1 through entered in switching processing block XPT are converted into video signals having video format 720p/50 by the format converters FC1 through FC3, respectively, to be signal-processed by the signal processing block PROC-1 along with video signal IN4. The video signals processed by the signal processing block PROC-1 are outputted as video signal OUT1 via video signal output processing block CNO-1. Further, the video signals processed by signal processing block PROC-1 are converted into the video signals having video format 1080i/59.94 via format converter FC-4 to be signal-processed by signal processing block PROC-2 along with video signal entered in switching processing block XPT. The video signals processed by signal processing block PROC-2 are outputted as video signal OUT2 via video signal output processing CNO-2.

On the other hand, referring to FIG. 5B indicative of the connection relationship with the arrangement converted by the analysis block 22, each video signal is processed as follows. Namely, video signals IN1 through having video format 1080i/59.94 and video signal IN4 having video format 720p/50 are entered in switching processing block XPT via video signal input blocks CN11 through CN14, respectively. Video signal IN4 entered in switching processing block XPT is converted into a video signal having video format 1080i/59.94 by format converter FC-2 to be signal-processed by signal processing block PROC-1 along with video signals IN1 through IN3 entered in switching processing block XPT. The video signals processed by signal processing block PROC-1 are converted into video signals having video format 720p/50 by format converter FC-1 to be outputted as video signals OUT1. Also, the video signals processed by signal processing block PROC-1 are signal-processed by signal processing block PROC-2 along with video signal IN3 entered in switching processing block XPT to be outputted from video signal output processing block CNO-2 as video signals OUT2.

As seen from the comparison between the connection relationship associated with FIG. 5A before arrangement conversion and the connection relationship associated with FIG. 5B after arrangement conversion, the analysis block 22 can delete the number of format converters FC by 2 and output video signals OUT1 and OUT2 processed in the same manner to the outside.

Thus, the analysis block 22 outputs a connection relationship configured to realize the same processing by use of less format converters FC. In the switcher 2, the signal switching processing is executed in accordance with the connection relationship outputted by the analysis block 22. This configuration allows the switcher 2 to use the minimum necessary number of format converters FC to reduce the circuit scale and cost and minimize the degradation in picture quality caused by format conversion.

With the switcher 2 having the configuration as described above, the analysis block 22 can present, to the user, the connection relationship with less format converters FC via the control panel 17.

Thus, the connection relationship may be changed after the setting for arrangement change is executed by the user who visually checked the connection relationship presented on the control panel 17. Also, the control block 16 of the switcher 2 may control the switching processing block 15 to provide the connection relationship obtained by the analysis block 22 without the setting by the user, thereby controlling the control block 16 to switch between connection relationships.

It should be noted that, in the switcher 2, the signal generators for generating synchronous signals from similar video references may be made common and a signal generator for generating a synchronous signal corresponding to the video format of a video signal to be processed by each processing block may be selected from among two or more signal generators made common for each video reference.

In addition, the switcher 2 can handle video signals having more video formats than mentioned above. In this case, video references of the types corresponding to video formats to be handled may be obtained from the video reference input block 11 to generate synchronous signals from the obtained video references by two or more signal generators, letting each processing block select a required one of these synchronous signals for operation.

If the switcher 2 is used for simultaneous broadcasting in which video signals having the same contents are broadcast with different video formats, the setting can be executed by one control panel instead of the control panels 17a and 17b on which the setting is executed for each video format as described above, thereby reducing the system scale.

The present application contains subject matter related to that disclosed in Japanese Priority Patent Application JP 2008-095444 filed in the Japan Patent Office on Apr. 1, 2008, the entire content of which is hereby incorporated by reference.

While preferred embodiments of the present invention have been described using specific terms, such description is for illustrative purpose only, and it is to be understood that changes and variations may be made without departing from the spirit or scope of the following claims.

What is claimed is:

1. A signal switching apparatus comprising:
a video reference input block in which video references having a plurality of types are entered;
a plurality of synchronous signal generating blocks configured to generate a synchronous signal from each of said video references having a plurality of types entered from said video reference input block;
a plurality of video signal input blocks in which a video signal having a video format corresponding to each of said video references having a plurality of types is entered;
a signal processing block configured to execute signal processing on said video signal in synchronization with a synchronous signal generated by one of said plurality of synchronous signal generating blocks;
a video signal output processing block configured to output said video signal in synchronization with a synchronous signal generated by one of said plurality of synchronous signal generating block;
a switching block configured to switch between supply destinations in which said signal processing block and said video signal output processing block to which a video signal entered in each of said plurality of video signal input blocks and a video signal subjected to signal processing by said signal processing block are supplied in synchronization with each of synchronous signals generated by said plurality of synchronous signal generating blocks; and
a control block configured to control a connection relationships that are switched by said switching block;
wherein, in synchronization with a synchronous signal generated from a video reference corresponding to a format of a video signal to be supplied to said signal processing block via said switching block, said control block controls said signal processing block to execute signal processing on said video signal and,
in synchronization with a synchronous signal generated from a video reference corresponding to a format of a video signal to be supplied to said video signal output processing block via said switching block, controls said video signal output processing block to output said video signal.

2. The signal switching apparatus according to claim 1, further comprising:
a format converting block configured to operate in synchronization with two synchronous signals generated by two of said plurality of synchronous signal generating blocks, receive a video signal having one video format via said switching block, and convert said video signal having said one video format into a video signal having another video format;
wherein said switching block executes supply destination switching in which said video signal entered in each of said plurality of video signal input blocks, said video signal processed by said signal processing block, and said video signal converted by said format converting block are supplied to said signal processing block, said format converting block, and said video signal output processing block and, in synchronization with a synchronous signal generated from a video reference corresponding to each of said one video format and said another video format, said control block controls said format converting block so as to convert the video format of said video signal.

3. The signal switching apparatus according to claim 2, further comprising:

an analysis block configured to, in a connection relationship in which said plurality of video signal input blocks, said signal processing block, said video signal output processing block, and said format converting block are switchingly interconnected by said switching block, if the number of connections of said format converting block to which a video signal is supplied via said switching block is set more than one, analyze the connection relationship between said format converting block and said signal processing block to acquire a connection relationship which is executed by use of said format converting block, said connection relationship being less than the number of connections set with substantially the same signal processing as a set connection relationship, wherein said control block controls said switching block such that said connection relationship obtained by said analysis block is provided.

4. A control method of a signal switching apparatus, comprising the steps of:

entering, through a video reference input block, video references having a plurality of types;

generating, through a plurality of synchronous signal generating block, a synchronous signal from each of said video references having a plurality of types entered from said video reference input block;

entering, through a plurality of video signal input blocks, a video signal having a video format corresponding to each of said video references having a plurality of types;

executing, through a signal processing block, signal processing on said video signal in synchronization with a synchronous signal generated by one of said plurality of synchronous signal generating blocks;

outputting, through a video signal output processing block, said video signal in synchronization with a synchronous signal generated by one of said plurality of synchronous signal generating block;

switching, through a switching block, between supply destinations in which said signal processing block and said video signal output processing block to which a video signal entered in each of said plurality of video signal input blocks and a video signal subjected to signal processing by said signal processing block are supplied in synchronization with each of synchronous signals generated by said plurality of synchronous signal generating blocks;

controlling, in synchronization with a synchronous signal generated from the video reference corresponding to the format of a video signal to be supplied to said signal processing block via a switching block, said signal processing block so as to execute signal processing on said video signal; and controlling said video signal output processing block in synchronization with a synchronous signal generated from the video reference corresponding to the format of a video signal to be supplied to said video signal output processing block via said switching block.

5. A signal switching apparatus comprising:

video reference input means in which video references having a plurality of types are entered;

a plurality of synchronous signal generating means for generating a synchronous signal from each of said video references having a plurality of types entered from said video reference input means;

a plurality of video signal input means in which a video signal having a video format corresponding to each of said video references having a plurality of types is entered;

signal processing means for executing signal processing on said video signal in synchronization with a synchronous signal generated by one of said plurality of synchronous signal generating means;

video signal output processing means for outputting said video signal in synchronization with a synchronous signal generated by one of said plurality of synchronous signal generating means;

switching means for switching between supply destinations in which said signal processing means and said video signal output processing means to which a video signal entered in each of said plurality of video signal input means and a video signal subjected to signal processing by said signal processing means are supplied in synchronization with each of synchronous signals generated by said plurality of synchronous signal generating means; and control means for controlling a connection relationships that are switched by said switching means;

wherein, in synchronization with a synchronous signal generated from a video reference corresponding to a format of a video signal to be supplied to said signal processing means via said switching means, said control means controls said signal processing means to execute signal processing on said video signal and, in synchronization with a synchronous signal generated from a video reference corresponding to a format of a video signal to be supplied to said video signal output processing means via said switching means, controls said video signal output processing means to output said video signal.

* * * * *